UNITED STATES PATENT OFFICE.

WILLIAM DONY, OF HONESDALE, PENNSYLVANIA.

IMPROVED OINTMENT.

Specification forming part of Letters Patent No. 51,154, dated November 28, 1865.

*To all whom it may concern:*

Be it known that I, WILLIAM DONY, of Honesdale, in the county of Wayne and State of Pennsylvania, have invented a new and Improved Medical Compound; and I do hereby declare that the following is a full, clear, and exact description thereof, which will enable others skilled in the art to fully understand and make use of the same.

This invention relates to an ointment intended to be applied to bruises or wounds of any kind and beneficial for men, and also for cattle or other animals.

My ointment is composed of white wax and yellow beeswax, spermaceti, neat's-foot oil, sweet-oil, and white and red precipitate.

If the ointment is to be used for men, the proportion in which these ingredients are mixed together is about as follows: white wax, three ounces; yellow beeswax, one ounce; spermaceti, four ounces; sweet-oil, nine ounces; neat's-foot oil, three ounces; white precipitate, fifteen-sixteenths of an ounce; red precipitate, one-sixteenth of an ounce.

For horses and cattle the proportion is slightly altered, as follows: yellow beeswax, three ounces; white wax, one ounce; spermaceti, four ounces; neat's-foot oil, ten ounces; sweet-oil, two ounces; red precipitate, fifteen-sixteenths of an ounce; white precipitate, one-sixteenth of an ounce.

It will be noticed that in both cases the aggregate quantity of wax and precipitate used is the same; but the quantities of the various articles are different.

In mixing the ingredients of my ointment together, I dissolve the wax, spermaceti, and oil over a gentle fire, then add the precipitate, and stir until cold.

What I claim as new, and desire to secure by Letters Patent, is—

The within-described composition for ointment, made of the ingredients above specified and mixed together in about the proportion and substantially in the manner set forth.

The above specification of my invention signed by me this 26th day of September, A. D. 1865.

WILLIAM DONY.

Witnesses:
JOHN McINTOSH,
CHAS. MENNER.